US007205710B2

(12) United States Patent
Jüstel et al.

(10) Patent No.: US 7,205,710 B2
(45) **Date of Patent: *Apr. 17, 2007**

(54) FLUORESCENT LAMP WITH ULTRAVIOLET REFLECTING LAYER

(75) Inventors: Thomas Jüstel, Aachen (DE); Walter Mayr, Alsdorf (DE); Cornelis Reinder Ronda, Aachen (DE); Volker Dirk Hildenbrand, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 156 days.

This patent is subject to a terminal disclaimer.

(21) Appl. No.: 10/515,693

(22) PCT Filed: May 27, 2003

(86) PCT No.: PCT/IB03/02020

§ 371 (c)(1), (2), (4) Date: Nov. 24, 2004

(87) PCT Pub. No.: WO03/100821

PCT Pub. Date: Dec. 4, 2003

(65) Prior Publication Data

US 2005/0242702 A1 Nov. 3, 2005

(30) Foreign Application Priority Data

May 29, 2002 (EP) ................................. 02011885

(51) Int. Cl.
*H01J 17/49* (2006.01)
*C09K 11/69* (2006.01)

(52) U.S. Cl. ............... 313/486; 313/580; 252/301.4 R; 252/301.4 S

(58) Field of Classification Search ................ 313/580, 313/486, 113, 503; 252/301.4 R, 301.4 S
See application file for complete search history.

(56) References Cited

U.S. PATENT DOCUMENTS

| | | | | |
|---|---|---|---|---|
| 4,764,301 | A * | 8/1988 | Awazu et al. | 252/301.4 P |
| 5,552,665 | A | 9/1996 | Trushell | |
| 5,602,444 | A | 2/1997 | Jansma | |
| 6,090,310 | A * | 7/2000 | Rao et al. | 252/301.4 R |
| 6,469,322 | B1 * | 10/2002 | Srivastava et al. | 257/89 |

* cited by examiner

*Primary Examiner*—Joseph Williams

(57) ABSTRACT

An ultraviolet reflecting layer and a fluorescent lamp is described, comprising an envelope having an inner surface, means within the lamp envelope for generating ultraviolet radiation, a light emitting layer of a luminescent material for generating visible light when impinged by ultraviolet radiation, and said ultraviolet reflecting layer, located between the light emitting layer and the inner surface of the lamp envelope, wherein the ultraviolet reflecting layer comprises a metal phosphate and/or a metal borate, with the metal being selected from Sc, Y, La, Gd, Lu and Al, or combinations thereof. The phosphates or borates used in the ultraviolet reflecting layer may optionally be doped by a Tb3+ and/or Dy3+ activator, to further improve the quantum yield of the conversion of UV radiation into visible light.

9 Claims, 2 Drawing Sheets

FLUORESCENT LAMP WITH ULTRAVIOLET REFLECTING LAYER

Figure 1:
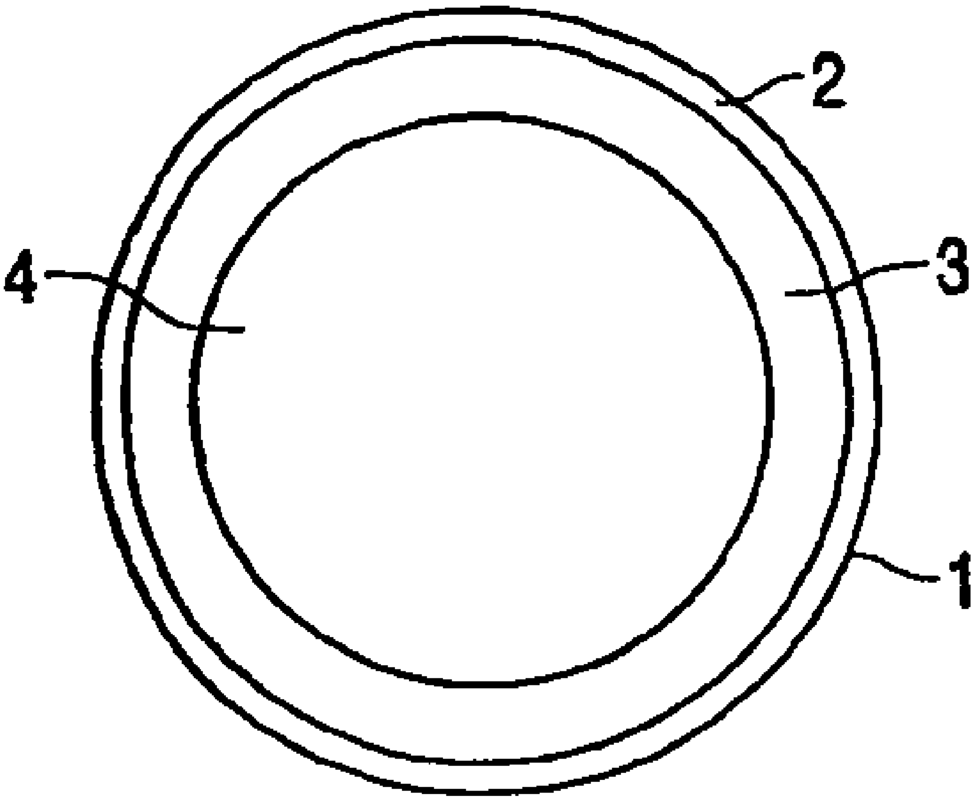

The invention relates to an ultraviolet reflecting layer and to fluorescent lamps comprising an envelope having an inner surface, means within the lamp envelope for generating ultraviolet radiation or a light emitting layer of a luminescence material for generating visible light when impinged by ultraviolet radiation, and said ultraviolet reflecting layer located between the light emitting layer and the inner surface of the lamp envelope, wherein the ultraviolet reflecting layer comprises a metal phosphate and/or a metal borate, with the metal being selected from scandium, yttrium, lanthanum, gadolinium, lutetium and aluminium, or combinations thereof.

Fluorescent lamps "low-pressure mercury vapor discharge lamps" usually have a lamp envelope with a filling of mercury and a rare gas, in which an electrically gas discharge is maintained during lamp operation. Unfortunately, the radiation emitted by the mercury gas discharge is mostly in the ultraviolet region, with the most intense lines of emission lying at 254 nm (85% of the radiation) and 185 nm (12% of the radiation). The ultraviolet radiation has to be converted into visible light by luminescent materials located in a layer coated onto the inner surface of the lamp envelope. This coating of luminescent materials, mostly a blend of phosphors, emits visible light when impinged by the ultraviolet radiation.

Since the ultraviolet lines of the mercury gas discharge would be absorbed by the glass of the lamp envelope, the luminescent material layer must be thick enough, to avoid a transmission of the ultraviolet radiation, or at least limit it to a reasonable extent. Otherwise, the efficiency of the fluorescent lamp would be lower than possible. Typically, in fluorescent lamps a luminescent material coating weight of 1.8 $mg/cm^2$ (60% coverage) to 3.0 $mg/cm^2$ (100% coverage) is used.

Since the luminescent materials significantly contribute to the production costs of the lamps, there is a continuous need for reducing the coating weight. Attempts have been made to solve this problem by reducing the particle size of the luminescent materials, but this approach is limited in many cases by a reduction in the quantum yield.

A further attempt has been made to provide an ultraviolet reflecting layer underneath the phosphor layer. With this reflecting layer, the ultraviolet radiation passing the luminescent layer is reflected back from the ultraviolet reflecting layer into the phosphor layer. With this ultraviolet reflecting layer, lower phosphor coating weights can be achieved.

U.S. Pat. No. 5,602,444 describes a fluorescent lamp having an ultraviolet reflecting barrier layer between the glass envelope and the phosphor layer, which consists of a blend of gamma-alumina and alpha-alumina.

U.S. Pat. No. 5,552,665 describes a fluorescent lamp with an ultraviolet reflecting barrier layer made of predominately gamma-alumina, having a primary crystal size of less than about 0.5 μm.

However, alumina shows several disadvantages. Firstly, it has a relatively high absorption already at 185 nm, due to its band gap of only 7.0 eV (180 un) which reduces the lamp efficiency. Secondly, layers consisting of alumina particles often show poor mechanical flexibility. In the production of compact fluorescent lamps (CFLs), high mechanical stability is necessary, since after coating of the lamp envelope with the ultraviolet reflecting layer and the luminescent layer, the coated lamp glass has to be further processed at relatively high temperatures, e.g. by bending, in order to obtain the typical form of a CFL lamp. If the ultraviolet reflecting layer is not stable enough, it will flake off from the glass during these further process steps, as well as the top phosphor layer displaced thereon.

Thus, there is a need for a highly efficient material for an ultraviolet reflecting layer in fluorescent lamps, which can be easily processed and which shows high mechanical flexibility and stability.

A further object of the present invention was to provide a ultraviolet reflecting layer which further to its primary function as a reflecting layer increases the overall efficiency of the lamp in that it is capable of re-emitting small amounts of energy by way of luminescence, resulting from a partial absorption of ultraviolet radiation.

The above objects are solved by a fluorescent lamp as described in the independent main claim.

Preferred embodiments of the present invention are disclosed in a combination of the features of the independent claim with the features disclosed in the dependent claims.

According to the present invention, there is provided a ultraviolet reflecting layer comprises a metal phosphate and/or a metal borate, with the metal being selected from Sc, Y, La, Gd, Lu and Al, or combinations thereof. Preferably, there is provided a ultraviolet reflecting layer comprised of a binary ortho-phosphate $MePO_4$ and/or a binary ortho-borate $MeBO_3$ with the metal Me being selected from Sc, Y, La, Gd, Lu and Al.

Further, there is provided a fluorescent lamp comprising an envelope having an inner surface, means within the lamp envelope for generating ultraviolet radiation, a light emitting layer of a luminescent material for generating visible light when impinged by ultraviolet radiation, and said ultraviolet reflecting layer, located between the light emitting layer and the inner surface of the lamp envelope, characterized in that the ultraviolet reflecting layer comprises a metal phosphate and/or a metal borate, with the metal being selected from Sc, Y, La, Gd, Lu and Al, or combinations thereof.

It has surprisingly been found, in the present invention, that phosphates or borates of certain rare earth and particularly lanthanide metal ions are especially suitable for use as an ultraviolet reflecting layer in fluorescent lamps, as well as phosphates or borates of the main group element Al. Phosphates and borates of metals like Sc, Y, La, Gd, Lu and Al, have a large band gap, so that they do not show a significant amount of absorption in the ultraviolet region.

Additionally, the phosphates and borates used in the invention may be prepared substantially free of defects, which is of major importance, since otherwise there may be a significant absorption, even at an energy which is lower than the band gap, caused by the so-called "Urbach tail". Furthermore, these materials allow the preparation of nanoparticles with particle sizes between about 10 and 300 nm, allowing the preparation of layers which show significantly improved scattering properties in the ultraviolet region than in the visible region.

The inventive ultraviolet layer, usable in fluorescent lamps, may consist of binary ortho-phosphates or binary ortho-borates of the type $MePO_4$ or $MeBO_3$, respectively, or combinations thereof, with the metal being selected from Sc, Y, La, Gd, Lu and Al. Also utilizable within the present invention are ternary phosphates $(Me1_{1-x}Me2_x)PO_4$ or ternary borates $(Me1_{1-x}Me2_x)BO_3$ with the metals Me1 and Me2 independently of each other selected from Sc Y, La, Gd, Lu and Al, and x is any number between zero and one ($0<x<1$).

The band gaps of these materials are high enough that they show only very little absorption at 185 nm, and practically no relevant absorption at 254 nm.

The optimum particle size for an efficient scattering of the plasma radiation is dependent on the wavelength of the light to be scattered and on the difference of the diffraction indices between the medium and the scattering material. For optimal reflection efficiency, the particle size should exceed the wavelength of the radiation to be reflected. Since, for example, $LaPO_4$ and $YPO_4$ have diffraction indices of 1.79 or 1.77, respectively, which are very similar to that of $Al_2O_3$ (1.77), and the lower mercury emission line at 185 nm has to be reflected, a particle size of at least about 185 nm, preferably about 200 nm, may be utilizable for the ultraviolet reflecting layer. However, in practice materials having a certain particle size distribution range are used, which are normally characterized by their average particle size distribution. Thus, materials having average particle sizes below 185 mm may also be used. In the inventive fluorescent lamp, the ultraviolet reflecting layer is made of particles having an average particle size below 500 nm, preferably between 50 nm and 400 nm and most preferred between 50 nm and 300 nm. Other suitable average particle size ranges may also be used, depending on the specific type of metal phosphate or borate used, e.g. 50 nm to up to 2000 nm, preferably 150 nm to 1000 nm and further preferred from 170 to 500 nm.

In order to improve the scattering properties, the ultraviolet reflecting layer may also consist of a mixture of two particle sizes, wherein the first particles have an average particle size of between 10 and 50 nm, preferably 10 to 30 nm, and the second particles have an average particle size of between 100 and 500 nm, preferably 100 to 300 nm. most preferred 100 to 200 nm.

The ultraviolet reflecting layer is usually coated, for example directly onto the inner surface of the lamp envelope, with a coating weight in the range of 0.05 to 5 mg/cm$^2$, preferably from 0.15 to 3 mg/cm$^2$, more preferred from 0.3 to 2 mg/cm$^2$ and most preferred about 0.5 mg/cm$^2$. Coating weights of 0.1 to 0.5 mg/cm$^2$ or 0.3 to 0.8 mg/cm$^2$ can also be used according to the invention.

The ultraviolet reflecting layer may be coated onto a substrate, for example onto a lamp envelope, by any suitable procedure known in the prior art, e.g. by a method as disclosed in U.S. Pat. No. 5,552,665. Mostly, the ultraviolet reflecting layer is coated, for example onto the inner surface of the lamp envelope, from an aqueous suspension or dispersion of the metal phosphate or borate used. Alternatively, suspensions or dispersions in organic solvents, like butyl acetate, or mixtures of organic solvents with water may also be used, if required. Conventional additives and adjuvants like stabilizers, dispersants, surfactants, thickening agents, defoaming agents, binders or powder conditioning agents and the like may be added, without substantially changing the final properties of the ultraviolet reflecting layer. Examples for commonly used suspension additives are cellulosic derivatives, polymeth-acrylic acid, polyvinyl alcohol or propylene oxide. After application of the suspension or dispersion the coated substrate, such as a glass tube, is heated, whereby the solvent and adjuvants are driven off, leaving behind the ultraviolet reflecting layer. Then a light emitting layer can be applied by similar techniques known in the art.

The light emitting layer of the fluorescent lamps according to the present invention consist of a luminescent material, which generates visible light when impinged by ultraviolet radiation. The luminescent material may be any material known in the prior art, suitable for use in the light emitting layer of a fluorescent lamp. In general, the luminescent material for the light emitting layer consists of a host lattice, which is doped with several percent of an activator. The host lattice is always an inorganic oxygen-containing material like oxides, aluminates, phosphates, borates, sulfates, germanates or silicates. The activator is a metal ion, often a rare earth metal ion, like for example, $Eu^{2+}$, $Tb^{3+}$, $Dy^{3+}$, $Ce^{3+}$, $Pr^{3+}$, but may also be a main group element ion like $Bi^{3+}$, $Pb^{2+}$ or $Sb^{3+}$ or a transition metal ion like $Mn^{2+}$ or $Mn^{4+}$. Within the present invention, the light emitting layer preferably includes one of the following luminescent materials or material blends:

$Ca_5(PO_4)_3(F,Cl)$:Sb,Mn
$BaMgAl_{10}O_{17}$:Eu, $LaPO_4$:Ce,Tb, $Y_2O_3$:Eu
$BaMgAl_{10}O_{17}$:Eu, $CeMgAl_{11}O_{19}$:Tb, $Y_2O_3$:Eu
$BaMgAl_{10}O_{17}$:Eu, $GdMB_5O_{19}$:Ce,Tb, $Y_2O_3$:Eu
$BaMgAl_{10}O_{17}$:Eu, A, $LaPO_4$:Ce,Tb, $Y_2O_3$:Eu
$BaMgAl_{10}O_7$:Eu, A, $CeMgAl_{11}O_{19}$:Ce,Tb, $Y_2O_3$:Eu
$BaMgAl_{10}O_{17}$:Eu, Mn, $GdMgB_5O_{10}$:Ce,Tb, $Y_2O_3$:Eu
$(Ba,Sr,Ca)_5(PO_4)_3(F,Cl)$:Eu, $LaPO_4$:Ce,Tb, $Y_2O_3$:Eu
$(Ba,Sr,Ca)_5(PO_4)_3(F,Cl)$:Eu, $CeMgAl_{11}O_{19}$:Tb, $Y_2O_3$:Eu
$(Ba,Sr,Ca)_5(PO_4)_3(F,Cl)$:Eu, $GdMgB_5O_{10}$:Ce,Tb, $Y_2O_3$:Eu
$LaPO_4$:CeTb, $Y_2O_3$:Eu
$CeMgAl_{11}O_{19}$:Tb, $Y_2O_3$:Eu
$GdMgB_5O_{10}$:Ce,Tb, $Y_2O_3$:Eu
$BaSi_2O_5$:Pb
$LPO_4$:Ce, $BaSi_2O_5$:Pb
$SrAl_{12}O_{19}$:Ce,$BaSi_2O_5$:Pb
$Y_3Al_5O_{12}$:Ce
$LaB_3O_6$:Gd,Bi
$SrB_4O_7$:Eu
$(Y,Gd)PO_4$:Ce
or $Mg_4GeO_{5,5}F$:Mn

These luminescent materials can be used with an average particle size of about 0,5 to 10 μm. The luminescent material of the light emitting layer absorbs the UV radiation emitted by the low-pressure vapor discharge and transforms it into visible light. Color and light intensity mainly depend from the type of luminescent material used.

The optimal thickness of the light emitting layer on the lamp envelope is at about 5–50 μm, but may be as thick as 20 μm. On the one hand, the layer should be thick enough to absorb sufficient ultraviolet radiation, but on the other hand, it should be thin enough in order have a high transmission of the visible radiation produced in the particles lying in the interior of the light emitting layer.

In the fluorescent lamp according to the present invention, the light emitting layer is coated onto the UV layer with a coating weight of about 0.5–5.0 mg/cm$^2$, preferably 1.0–3.5 mg/cm$^2$ and most preferred from 1.5 mg/cm$^2$ to 3.0 mg/cm$^2$.

Although having a large band gap, e.g. $LaPO_4$ and $GdPO_4$ have a band gap of 8.2 eV or 8.3 eV, respectively, small amounts of ultraviolet energy especially from the 185 nm line of Hg are absorbed by the inventive reflecting materials. In order to further improve the total efficiency of the lamp, this energy may optionally also be converted at least partially into visible light by suitably activating the phosphate or borate material to generate luminescence.

In an especially preferred embodiment of the present invention, the UV reflecting layer further comprises an activator, which causes the layer to reknit the energy received from a partial absorption of the mercury 185 nm line by way of luminescence. The activator has to be selected from materials which substantially do not show any absorption at 254 nm, but which absorb at least some energy at 185 nm, by way of an energy transfer, and re-emits this energy by luminescence. The metal phosphates and borates used in the present invention as the UV reflecting layer, although having a large band gap, show some small amount of absorption in the 185 nm region. This energy may be used with the help of an activator to produce further visible light in that the UV reflecting layer is also capable of emitting luminescent light, when activated by a suitable activator.

According to a further aspect of the invention, it has been found that $Tb^{3+}$ and/or $Dy^{3+}$ is suitable as an activator for this purpose, since metal phosphate and metal borate which is doped by $Tb^{3+}$ and/or $Dy^{3+}$ is able to re-emit absorbed energy from the mercury 185 nm line, but cannot be excited by the 254 nm line. This activation may be used to further improve the energy yield of a fluorescent lamp with the inventive UV reflecting layer. The metal phosphates or borates used in the ultraviolet reflecting layer of the invention may thus optionally be doped with a $Tb^{3+}$ and/or $Dy^{3+}$ activator, to further improve the quantum yield of the conversion of UV radiation into visible light.

Thus, in a preferred embodiment of the present invention, the UV reflecting layer and/or fluorescent lamp comprises an UV reflecting layer consisting of particles comprised of $MePO_4$:Tb, $MeBO_3$:Tb, $(Me1_{1-x}Me2_x)PO_4$:Tb and/or $(Me1_{1-x}Me2_x)BO_3$:Tb, or mixtures thereof with Me, Me1 and Me2 independently of each other, being selected from Sc, Y, La, Gd, Lu and Al, and 0<x<1.

The inventive fluorescent lamps can be constructed like any other fluorescent lamp of the prior art, by similar production methods and with the use of the same elements and components. Typically, the fluorescent lamp comprises an elongate glass tube (1) or light-transmissive lamp envelope with a tubular cross section, as shown in FIG. 1. The inner surface thereof is coated with the ultraviolet reflecting layer (2), comprising a metal phosphate or metal borate of Sc, Y, La, Gd, Lu or Al. Disposed thereon is the light emitting layer (3), made of a luminescent material. The lamp is hermetically sealed at the ends and provided with means within the lamp envelope for generating ultraviolet radiation This is accomplished by a discharge-sustaining fill gas (4) inside the glass tube, typically an inert gas such as argon at a low pressure in combination with a small quantity of mercury. Furthermore, a pair of electrode structures (not shown) for providing the discharge is provided in the lamp.

Figure 2:
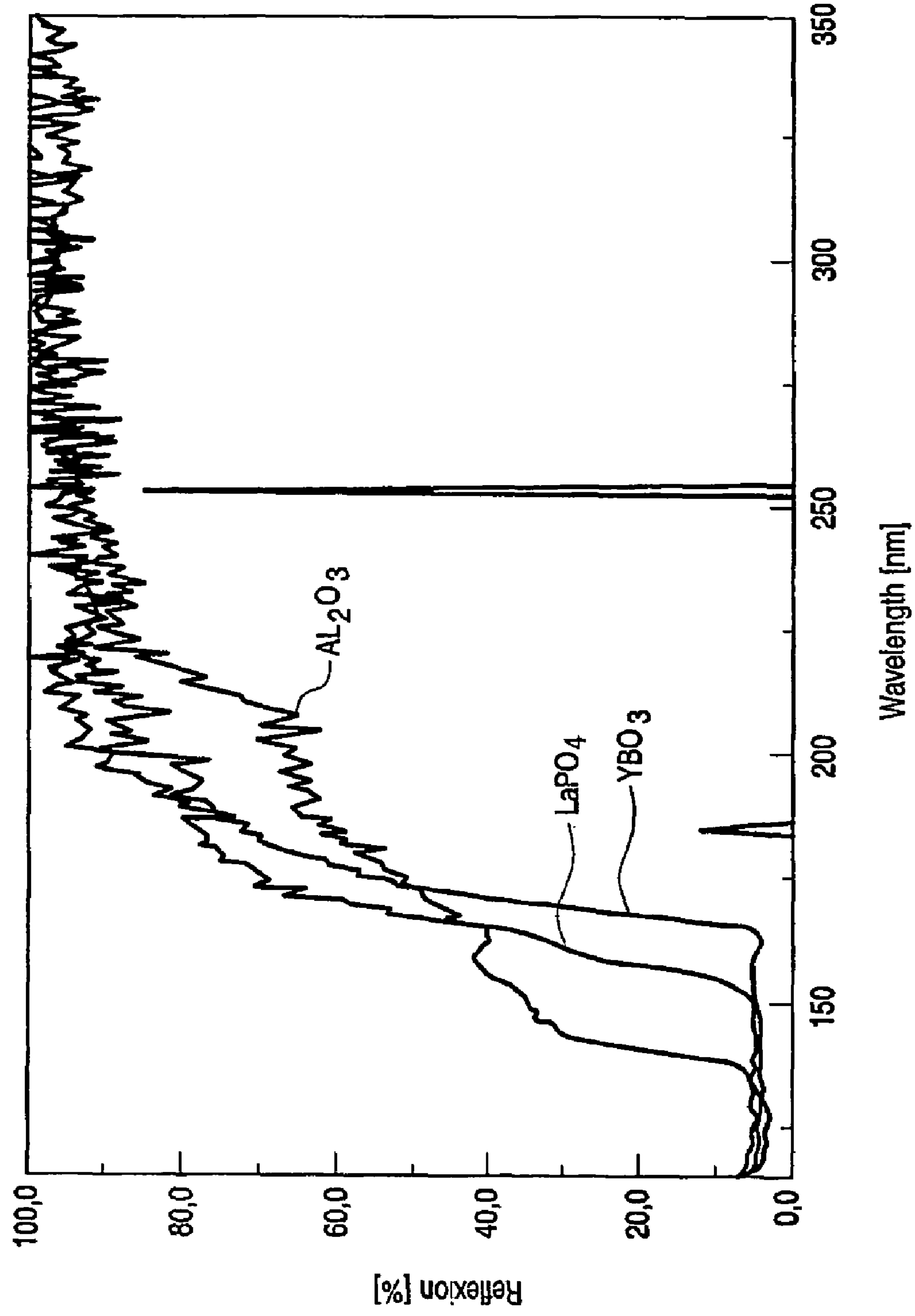

FIG. 2 is a graph showing the reflection in the ultraviolet region of two examples of materials for the ultraviolet reflecting layer according to the invention compared with conventionally used $Al_2O_3$. Both materials, $LaPO_4$ and $YBO_3$ show practically a total reflection at the 254 nm line of the Hg low pressure emission spectrum. Additionally, the reflection of $LaPO_4$ and $YBO_3$ at the 185 nm line is about 10–20% higher compared to that of conventionally used $Al_2O_3$. Thus, the materials used according to the invention are superior in their reflective properties in view of typical prior art materials.

The use of the metal borates and phosphates of Sc, Y, La, Gd, Lu or Al according to the invention as materials for the UV reflecting layer in fluorescent lamps, has several significant advantages:

These materials have a very high reflection even in the visible region, so they have a good appearance and may easily compete with $Al_2O_3$ or other reflector materials like $BaSO_4$. Further, the metal borates and phosphates show a very small mercury consumption, so that no problems as for example progressive reduction of light emission with time or the like may be expected to arise from these components. The most important advantage, however, is that the borates and phosphates can act as fluxing agents, resulting in an excellent mechanical stability and flexibility of the ultraviolet reflecting layer in high temperature processing, due to the fact that these materials can fuse into the glass surface of the lamp envelope. This is because the melting point of the metal phosphates and borates used according to the invention is close to the temperature of glass softening in glass bending and processing operations (about 580° C.). Since it has the possibility to at least partially melt and fuse into the glass, the ultraviolet reflecting layer of the invention is scratch resistant and shows a significantly improved resistance against flaking off during high temperature bending operations, as used in the production of compact fluorescent lamps (CFLs). In contrast thereto, alumina has a melting point above 2000° C., and thus cannot fuse with the glass surface during bending and processing. Furthermore, at the temperature of glass processing operations, small particle sized alumina has a tendency to crystallize in sintering processes, which further reduces the reflection performance.

The invention is now further described by the following embodiments and examples, which are provided for illustrative purposes only, and do not indicate any restriction on the scope of the invention as described hereinbefore and claimed in the attached claims.

EXAMPLES

1. Fluorescent lamp with $LaPO_4$ as UV reflecting layer.

A glass tubing consisting of a standard soft glass as it is typically used for fluorescent lamp envelopes is coated with an aqueous suspension of $LaPO_4$ particles. The coating weight is adjusted to about 0.5 mg/cm$^2$.

The reflection performance of this lamp has been determined with 60% reflection at 254 nm. At the same time, the reflection at 600 nm is only 20%. This result is comparable to that achieved with the use of conventional $Al_2O_3$.

2. Fluorescent lamp with $YBO_3$ as UV reflecting layer

A glass tube consisting of a standard soft glass, as it is typically used for fluorescent lamps, is coated with an aqueous suspension of $YBO_3$ particles. The coating weight is adjusted to about 1.0 mg/cm$^2$.

The reflection performance of this lamp has been determined with 90% at 254 nm. Furthermore, the reflection at 600 nm is only 35%. This result is comparable to the result achieved with the use of $Al_2O_3$.

The invention claimed is:

1. An ultraviolet reflecting layer suitable for use in a fluorescent lamp, the ultraviolet reflecting layer comprising:
a metal phosphate and/or a metal borate, with the metal being selected from Sc, Y, La, Gd, Lu and Al, or combinations thereof; and
an activator, wherein the activator is configured (i) to enable the ultraviolet reflecting layer, having a primary purpose as a reflecting layer, to re-emit energy received from a partial absorption of ultraviolet energy at 185 nm by way of luminescence, and (ii) to enable the ultraviolet reflecting layer to exhibit substantially no ultraviolet enemy absorption at 254 nm.

2. The ultraviolet reflecting layer according to claim 1, wherein the ultraviolet reflecting layer comprises a binary ortho-phosphate $MePO_4$ and/or a binary ortho-borate $MeBO_3$ with the metal Me being selected from Sc, Y, La, Gd, Lu and Al.

3. The ultraviolet reflecting layer according to claim 1, wherein the ultraviolet reflecting comprises a ternary phosphate $(Me1_{1-x}Me2_x)PO_4$ and/or a ternary borate $(Me1_{1-x}Me2_x)BO_3$ with the metals Me1 and Me2 independently being selected from Se, Y, La, Gd, Lu and Al, and 0<x<1.

4. The ultraviolet reflecting layer according to claim 1, wherein the average particle size of the particles in the ultraviolet reflecting layer is between 50 nm and 400 nm.

5. The ultraviolet reflecting layer according to claim 1, wherein the ultraviolet reflecting layer consists of a mixture of particles with an average size of 10 to 50 nm and particles with an average size of 100 to 300 nm.

6. The ultraviolet reflecting layer according to claim 1, wherein the activator comprises $Tb^{3+}$ and/or $Dy^{3+}$.

7. The ultraviolet reflecting layer according to claim 1, wherein the ultraviolet reflecting layer consists of particles comprised of $MePO_4$:Tb, $MeBO_3$:Tb, $(Me1_{1-x}Me2_x)PO_4$:Tb and/or $(Me1_{1-x}Me2_x)BO_3$:Tb, or mixtures thereof with Me, Me1 and Me2 independently being selected from Sc, Y, La, Gd, Lu and Al, and $0<x<1$.

8. A fluorescent lamp comprising an envelope having an inner surface, means within the lamp envelope for generating ultraviolet radiation, a light emitting layer of a luminescent material for generating visible light when impinged by ultraviolet radiation, and an ultraviolet reflecting layer, the ultraviolet reflecting layer being located between the light emitting layer and the inner surface of the lamp envelope, wherein said fluorescent lamp comprises an ultraviolet reflecting layer according to claim 1.

9. A method of providing an ultraviolet reflecting layer, preferably in fluorescent mercury vapor discharge lamps, comprising:

use of $MePO_4$, $MeBO_3$, $(Me1_{1-x}Me2_x)PO_4$ and/or $(Me1_{1-x}Me2_x)BO_3$, or mixtures thereof with Me, Me1 and Me2 independently being selected from Sc, Y, La, Gd, Lu and Al, and $0<x<1$, as well as the corresponding Tb doped phosphates and/or borates as an ultraviolet reflecting layer, wherein the Tb comprises an activator and wherein the activator is configured (i) to enable the ultraviolet reflecting layer, having a primary purpose as a reflecting layer, to re-emit energy received from a partial absorption of ultraviolet energy at 185 nm by way of luminescence, and (ii) to enable the ultraviolet reflecting layer to exhibit substantially no ultraviolet energy absorption at 254 nm.

* * * * *